United States Patent
Segawa

(10) Patent No.: US 6,262,815 B1
(45) Date of Patent: Jul. 17, 2001

(54) IMAGE SENSOR

(75) Inventor: Satoshi Segawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/129,416

(22) Filed: Aug. 5, 1998

(30) Foreign Application Priority Data

Aug. 6, 1997 (JP) .................................................. 9-212063

(51) Int. Cl.[7] .............................. H04N 1/04; G02B 26/08
(52) U.S. Cl. ......................... 358/494; 358/474; 358/480; 358/481; 359/202; 359/203; 359/204; 359/205
(58) Field of Search .................................... 358/474, 494, 358/480, 481; 359/202, 203, 204, 205

(56) References Cited

U.S. PATENT DOCUMENTS

| 4,005,926 | * | 2/1977 | Neale et al. ............................... 350/7 |
| 5,200,849 | * | 4/1993 | Inagaki et al. ........................ 359/196 |
| 5,233,368 | * | 8/1993 | Yamanaka et al. .................... 346/108 |
| 5,757,518 | * | 5/1998 | Kashitani ............................... 358/474 |
| 5,781,269 | * | 7/1998 | Ito et al. ................................ 356/375 |
| 5,805,323 | * | 9/1998 | Ichikawa ............................... 359/205 |
| 5,807,648 | * | 9/1998 | Takeda ...................................... 430/5 |
| 5,875,042 | * | 3/1999 | Kashitani et al. .................... 358/474 |
| 5,875,043 | * | 3/1999 | Ito ......................................... 358/475 |
| 5,931,758 | * | 8/1999 | Sakai et al. ........................... 359/204 |
| 5,973,798 | * | 10/1999 | Segawa et al. ....................... 358/497 |

FOREIGN PATENT DOCUMENTS

| 49-66143 | 6/1974 | (JP) . |
| 63-37772 | 2/1988 | (JP) . |
| 3-10564 | 1/1991 | (JP) ................................. H04N/1/04 |
| 4-311146 | 11/1992 | (JP) ............................. H04N/1/028 |
| 6-78118 | 3/1994 | (JP) ................................. H04N/1/04 |
| 6-169372 | 6/1994 | (JP) . |
| 8-214127 | 8/1996 | (JP) ................................. H04N/1/19 |

* cited by examiner

Primary Examiner—Cheukfan Lee
(74) Attorney, Agent, or Firm—McGuireWoods LLP

(57) ABSTRACT

There is provided an image scanner including (a) an image sensor, (b) a lens for focusing images onto the image sensor, (c) a reflecting mirror for directing images of an object to the image sensor through the lens, and (d) a driver for rotating the reflecting mirror. The reflecting mirror has a first width located closer to the lens and a second width located remoter from the lens than the first width, both of the first and second widths extending in parallel with the image sensor. The first width is designed to be smaller than the second width. The reflecting mirror is preferably trapezoidal. The driver is within a difference between the first and second widths so that the driver does not exist beyond the second width of the reflecting mirror. Since the driver is arranged not to exist beyond a width of the reflecting mirror, it is possible to make the image sensor smaller in a size as a whole.

20 Claims, 6 Drawing Sheets

IMAGE SENSOR

BACKGROUND OF THE INVENTION

1. Field of the Invention

The invention relates to an image scanner, and more particularly to an image scanner reading images such as letters and figures, and converting them into digital data.

2. Description of the Related Art

An image scanner employing a linear image sensor for converting images into electric signals together with a sub-scanner to thereby read two-dimensional images is grouped, with respect to a shape, into a flat bed type where a document is turned over and then a box-shaped reader reads the document, a handy type where an operator sub-scans a document with a reader, and a camera type where a reading unit equipped with a linear image sensor is spaced away from a document to be read.

A camera type image scanner has advantages that a document can be read, if only the document is put below a reading unit, and that it is possible to read a document having a thickness such as a book or a three-dimensional document. As examples of a camera type image scanner are known "Image Scanner DS-3000" commercially available from Chinnon Co. and "Oban Sokusha" commercially available from Casio Corporation.

In a camera type image scanner, a document spaced away from a reading unit is focused by means of a lens, and the thus focused partial images are successively read by a linear image sensor with being varied by sub-scanning operation. The partial images read into the linear image sensor is synthesized into two-dimensional image data.

In one of methods of producing two-dimensional images by sub-scanning operation, a sub-scanning reflecting mirror is located between a lens and a document to be read or between a lens and a linear image sensor. Partial images focused onto the linear image sensor are varied by rotating or moving the sub-scanning reflecting mirror, and then, synthesized into two-dimensional images.

FIG. 1 illustrates one of conventional image scanners. The illustrated image scanner includes a linear image sensor 6 for converting images into electric signals, a lens 5 for focusing images of a document 7 to be read onto the linear image sensor 6, a sub-scanning reflecting mirror 1 for successively directing partial images to the linear image sensor 6 through the lens 5, a sub-scanning device 4 for rotating or moving the sub-scanning reflecting mirror 1, a linear image sensor driving circuit 10 which transmits drive signals to the linear image sensor 6, a processing circuit 11 receiving electric signals from the linear image sensor 11, and an analog/digital converter circuit 12 for converting electric signals received from the linear image sensor 6 through the processing circuit 11 into digital electric signals.

The sub-scanning reflecting mirror 1 is generally designed to be rectangular, as illustrated in FIG. 1. The sub-scanning reflecting mirror 1 has to have a certain size or greater defined by an effective length of the linear image sensor 6, a lens aperture and a focal distance of the lens 5, a distance between the sub-scanning reflecting mirror 1 and the document 7, and an area to be read in the document 7.

Various attempts have been made to make an image scanner smaller in a size. For instance, Japanese Unexamined Patent Publication No. 8-214127 published on Aug. 20, 1996 has suggested a flat bed type image scanner wherein a sensor for sensing a size of a document is situated outside a reading unit to thereby enhance flexibility in an arrangement of parts, ensuring a smaller size in an image scanner.

Japanese Unexamined Patent Publication No. 4-311146 published on Nov. 2, 1992 has suggested the use of a focusing transmittal array for an image sensor in order to have image formation by virtue of lens effect and a light path length. In addition, a half mirror and a reflecting mirror are positioned in an image sensor module so that a light path between a document to be read and the image sensor is in parallel with the document. This structure ensures a thin image sensor module a long light path length, resulting in a deeper depth of field.

Japanese Unexamined Patent Publication No. 3-10564 published on Jan. 18, 1991 has suggested an image scanner including a transparent plate and a reflecting plate. A light reflected at a document to be read is made to reflect at a plurality of times in the transparent plate. According to the Publication, it is possible to make a space required for a reflected light to advance smaller with an optical path length of a reflected light being kept sufficient, which ensures a smaller size of an image scanner.

Japanese Unexamined Patent Publication No. 6-78118 published on Mar. 18, 1994 has suggested an image scanner including a case, and a frame fixed in the case. Parts for constituting an image scanner, such as a laser source, a collimator lens, and a reflecting mirror are all secured to the frame, which ensures the smaller number of parts and a smaller size of an image scanner.

In a camera type image scanner, suppose that a document to be read lies on a desk, a reading unit is located about at the level of operator's eyes. Accordingly, if a reading unit is big, an operator cannot look at a document or smoothly handle the image scanner. Thus, a smaller image scanner is still in need.

In order to make a reading unit of a camera type image scanner smaller in a size, it would be necessary to make a sub-scanning reflecting mirror and a sub-scanning device smaller. As mentioned earlier, in an image scanner having a sub-scanning reflecting mirror designed to be rotatable or movable, the sub-scanning reflecting mirror is generally rectangular, and has to have a certain area or greater in order to prevent deterioration in brightness. In addition, a sub-scanning device for rotating or moving the reflecting mirror has to be positioned outside the reflecting mirror so as not to intercept an optical path of reflected lights.

Thus, a conventional image scanner having a rectangular sub-scanning reflecting mirror cannot avoid having a width equal to a sum of a width of a sub-scanning reflecting mirror and a width of a sub-scanning device. That is, a conventional image scanner has a problem that it cannot be made smaller than a width of a sub-scanning reflecting mirror.

A sub-scanning reflecting mirror varies a reflection angle to thereby successively focus partial images onto a linear image sensor, and is designed to rotate or move. If a movable portion of the reflecting mirror had a great mass, the reflecting mirror would have a great inertia, which causes a problem that the reflecting mirror cannot be readily controlled. This further causes a problem of deterioration of image qualities.

As having been explained so far, it was quite difficult or almost impossible in a conventional image scanner having a rectangular reflecting mirror to make an image scanner smaller in a size without deterioration of brightness and quality of images.

SUMMARY OF THE INVENTION

It is an object of the present invention to provide an image scanner capable of having a smaller size and a movable portion having reduced mass without deterioration of brightness and quality of images.

There is provided an image scanner including (a) an image sensor, (b) a lens for focusing images onto the image sensor, and (c) a reflecting mirror for directing images of an object to the image sensor through the lens, wherein the reflecting mirror has a first width located closer to the lens and a second width located remoter from the lens than the first width, both of the first and second widths extending in parallel with the image sensor, and the first width is formed smaller than the second width.

It is preferable that the reflecting mirror has a width gradually increasing from the first width to the second width. The reflecting mirror may be linearly symmetric or asymmetric about an axis of the lens, in both cases of which, it is preferable that the reflecting mirror is trapezoidal. When the reflecting mirror is designed to be asymmetric about an axis of the lens, the reflecting mirror may be designed to have two right-angle corners and a hypotenuse.

The image sensor may further include either a device for moving the reflecting mirror along an axis of the lens or a device for rotating the reflecting mirror about an axis perpendicular to an axis of the lens. For instance, the device for rotating the reflecting mirror may be designed to include (a) an arm rotatable together with the reflecting mirror about an rotational axis of the reflecting mirror, and having first and second ends, (b) a voice coil motor (VCM) supported at the first end of the arm for rotating the reflecting mirror, (c) a position sensitive device (PSD), (d) a light source for emitting a light to the position sensitive device, and (e) a plate supported at the second end of the arm for intercepting the light from reaching the position sensitive device as the reflecting mirror rotates.

There is further provided an image scanner including (a) an image sensor, (b) a lens for focusing images onto the image sensor, (c) a reflecting mirror for directing images of an object to the image sensor through the lens, and (d) a device for supporting or driving the reflecting mirror, wherein the reflecting mirror has a first width located closer to the lens and a second width located remoter from the lens than the first width, both of the first and second widths extending in parallel with the image sensor, and the first width is formed smaller than the second width, the device being situated within a difference between the first and second widths so that the device does not exist beyond the second width of the reflecting mirror.

In an image scanner in accordance with the present invention, a sub-scanning reflecting mirror is designed to be trapezoidal, for instance. Hence, a, sub-scanning device for rotating or moving a reflecting mirror can be positioned besides the reflecting mirror within a difference between first and second widths of the reflecting mirror, which ensures that an image scanner can be made smaller without deterioration of brightness in a document to be read.

In addition, the reflecting mirror in an image scanner in accordance with the present invention can have a smaller mass than that of a rectangular reflecting mirror. Hence, the reflecting mirror can be more stably controlled than a conventional, rectangular reflecting mirror. Thus, it is possible to design a reading unit including a sub-scanning device and a sub-scanning reflecting mirror to have a smaller width without deterioration of quality of images.

Since the reading unit has a smaller size, even if the reading unit is located at the level of operator' eyes, the operator can smoothly handle the image scanner.

Since a sub-scanning reflecting mirror, which is a movable portion in an image scanner, has a reduced mass, controllability in sub-scanning can be enhanced, which ensures that a document can be read more rapidly than before.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

The inventor had noticed that a width of an optical path having an influence on brightness of images to be read is different across a lens having a definite diameter in an image scanner including a combination of a linear image sensor and a sub-scanning system.

Hereinbelow is explained an example where a lens for focusing images onto a linear image sensor is designed to have a width smaller than a width of a document to be read. Specifically, a document is a sheet in A4 size having a width of 210 mm, and a lens has a diameter in the range of 20 mm to 40 mm.

Figure 1:
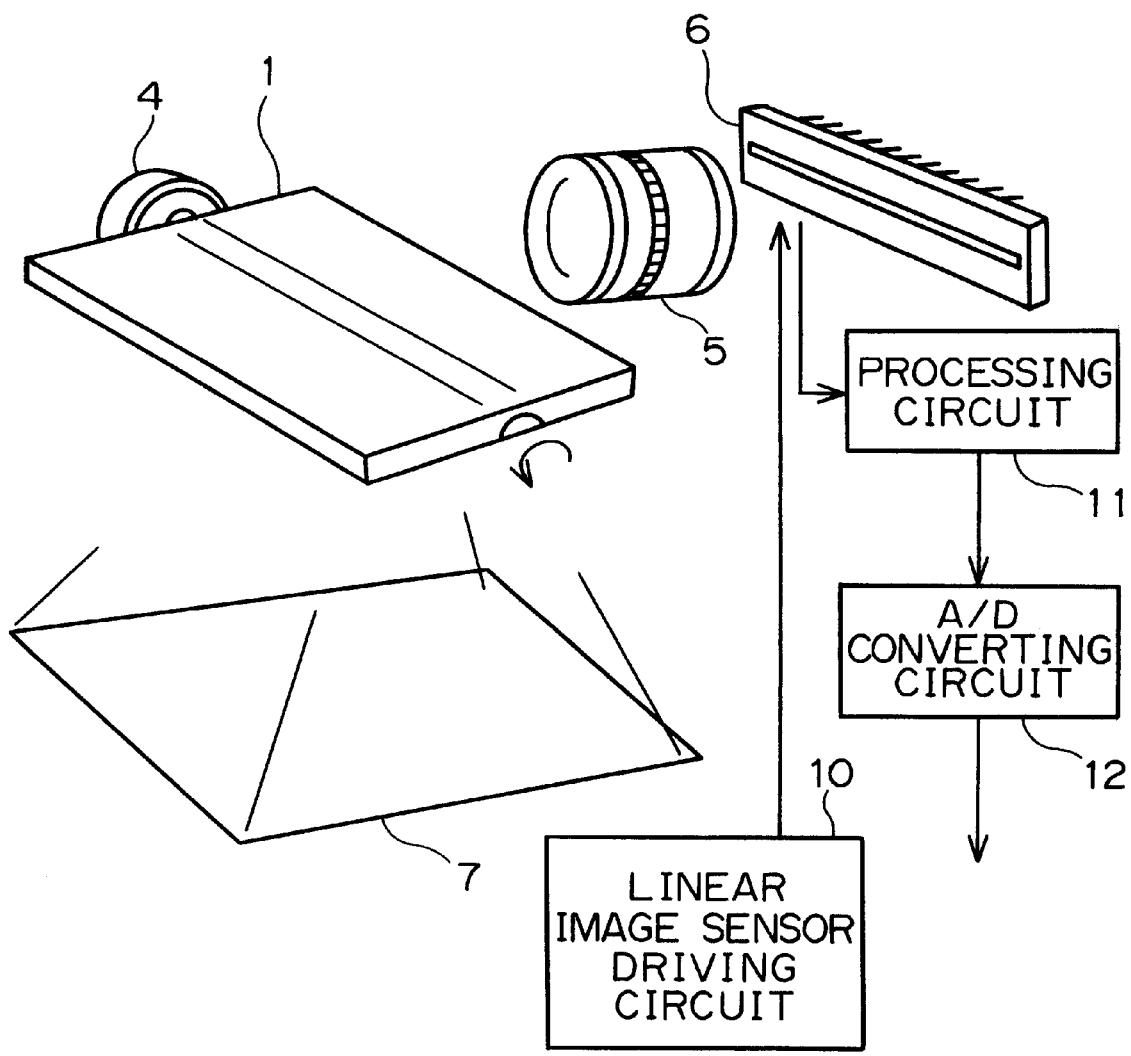
FIG. 1 is a perspective view illustrating a conventional image scanner.
Figure 2A:
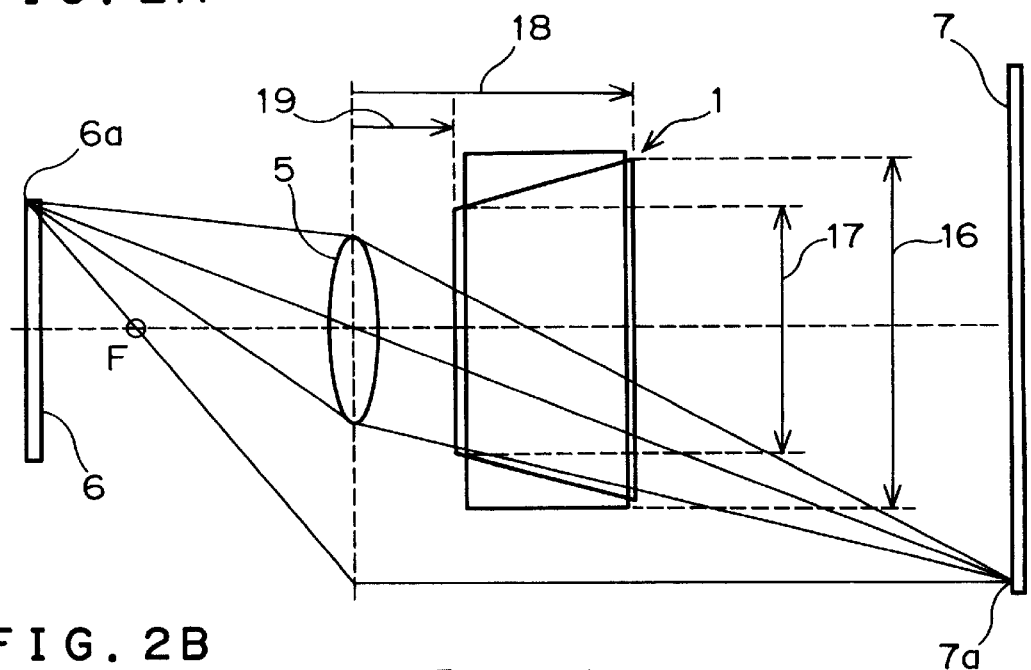
FIG. 2A is a top plan view illustrating a reading unit with a document to be read being illustrated horizontally.
Figure 2B:
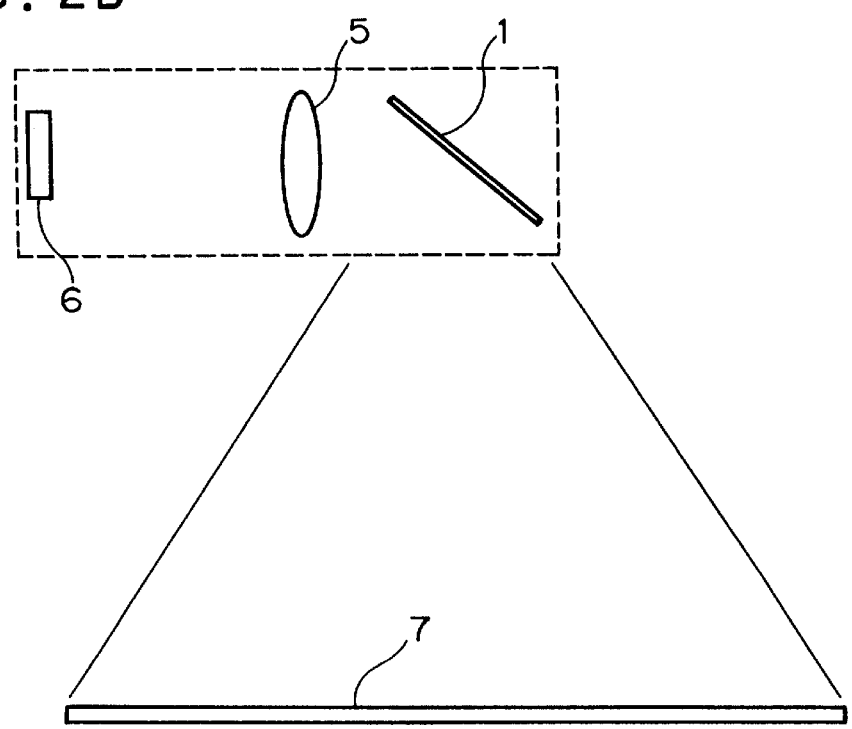
FIG. 2B is a side view illustrating the reading unit illustrated in FIG. 2A.

FIGS. 2A and 2B shows a relation between a length of an optical path between a sub-scanning reflecting mirror and a lens, and a requisite width of the sub-scanning reflecting mirror in an image scanner where a sub-scanning reflecting mirror is situated in an optical path between a lens and a document to be read. An optical path from a document 7 to be read to a linear image sensor through a sub-scanning reflecting mirror 1 and a lens 5 is illustrated in FIGS. 2A and 2B.

As illustrated in FIG. 2A, there is an optical path along which images reflected at an end 7a of the document 7 are further reflected at the sub-scanning reflecting mirror 1, and then, focused onto a particular section 6a of the linear image sensor 6 through the lens 5. A focusing characteristic of the lens 5 ensures that a light passing through a center of the lens 5 and a light passing through an end of the lens 5 are all focused onto the particular section 6a of the linear image sensor 6.

As a result, a horizontal distance between an optical path and a center of the lens 5 is smaller at a point closer to the lens 5, and is greater at a point remoter from the lens 5. Specifically, as illustrated in FIG. 2A, the sub-scanning reflecting mirror 1 has to have a first width 16 at a first distance 18 from the lens 5, and a second width 17 at a second distance 19 from the lens 5. As is obvious, the first distance 18 is greater than the second distance 19, and the first width 16 is greater than the second width 17. Hence, the sub-scanning reflecting mirror 1 may be designed to have a smaller width located closer to the lens 5 than a width located remoter from the lens 5. Even if a width located closer to the lens 5 is formed smaller than a width located remoter from the lens 5, an optical path required for focusing images onto the linear image sensor 6 is not intercepted, and images focused on the linear image sensor 6 are not adversely influenced.

When the sub-scanning reflecting mirror 1 is inclined relative to the document put below the reflecting mirror 1 so that images reflected from the document 7 are directed to the lens 5, as illustrated in FIG. 2B, the sub-scanning reflecting mirror 1 may be designed to have an upper side shorter than a lower side. For instance, the sub-scanning reflecting mirror 1 may be designed to be trapezoidal.

An image scanner which rotates or moves the sub-scanning reflecting mirror 1, and synthesizes partial images focused of the document 7 on the linear image sensor 6 to thereby produce two-dimensional images needs to have a driver for driving the sub-scanning reflecting mirror 1. By designing the sub-scanning reflecting mirror 1 to be trapezoidal, for instance, a sub-scanning device for supporting or driving the sub-scanning reflecting mirror 1 can be positioned along an oblique line of the trapezoidal reflecting mirror 1 so that the sub-scanning device does not exist beyond a maximum width of the reflecting mirror 1.

Figure 3:
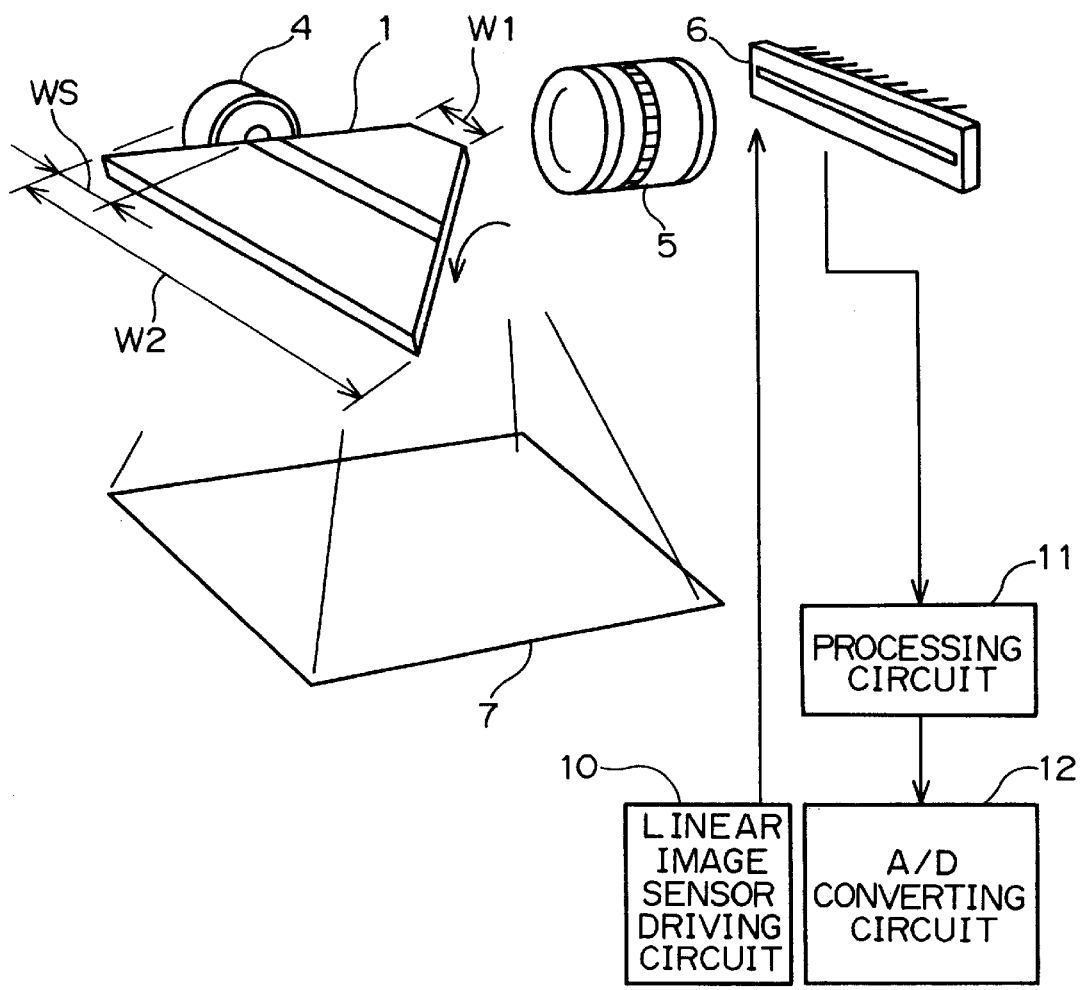
FIG. 3 is a perspective view illustrating an image scanner in accordance with the first embodiment of the present invention.

FIG. 3 illustrates a specific structure of an image scanner in accordance with the first embodiment. The illustrated image scanner includes a linear image sensor 6 for converting images into electric signals, a lens 5 for focusing images of a document 7 to be read onto the linear image sensor 6, a sub-scanning reflecting mirror 1 for successively directing partial images of the document 7 to the linear image sensor 6 through the lens 5, a sub-scanning device 4 for rotating the sub-scanning reflecting mirror 1, a linear image sensor driving circuit 10 which transmits drive signals to the linear image sensor 6, a processing circuit 11 receiving electric signals from the linear image sensor 11, and an analog/digital converter circuit 12 for converting electric signals received from the linear image sensor 6 through the processing circuit 11 into digital electric signals.

The sub-scanning reflecting mirror 1 is designed to be trapezoidal. In the illustrated embodiment, since the document is laid below the sub-scanning reflecting mirror 1, the sub-scanning reflecting mirror 1 is designed to have a first width W1 located closer to the lens 5 and a second width W2 located remoter from the lens 5 than the first width W1 and greater than the first width W1.

As illustrated in FIG. 3, the sub-scanning device 4 for rotating the sub-scanning reflecting mirror 1 has a width Ws. The width Ws is smaller than a half of a difference between the first and second widths W1 and W2. Namely, $$Ws < (W2-W1)/2$$

Hence, the sub-scanning device 4 having the width Ws can be positioned along an oblique line of the trapezoidal sub-scanning reflecting mirror 1 within a difference between the first and second widths W1 and W2 so that the sub-scanning device 4 does not exist beyond the maximum width W2 of the sub-scanning reflecting mirror 1.

Images of the document 7 are reflected at the sub-scanning reflecting mirror 1, and then focused onto the linear image sensor 6. As the sub-scanning reflecting mirror 1 is rotated by the sub-scanning device 4, the document images, focused onto the linear image sensor 6 varies. The linear image sensor 6 successively converts the varying images of the document 7 into electric signals in accordance with drive signals transmitted from the linear image sensor driving circuit 10. The thus converted electric signals are further converted into digital electric signals by the processing circuit 11 and the A/D converting circuit 12. The thus produced partial images are combined with previously produced partial images to thereby produce two-dimensional images.

Second Embodiment

Figure 4:
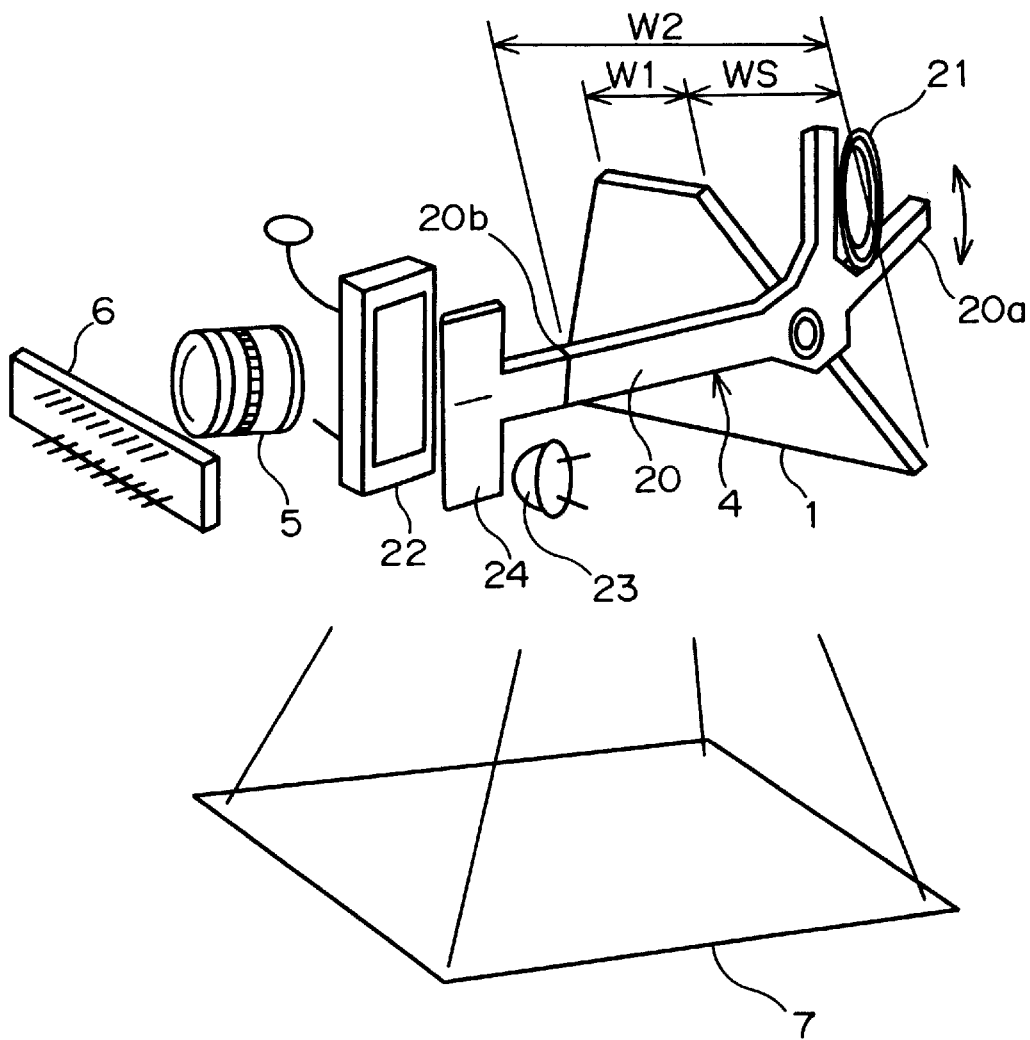
FIG. 4 is a perspective view illustrating an image scanner in accordance with the second embodiment of the present invention.

FIG. 4 illustrates an image sensor in accordance with the second embodiment. The image sensor in accordance with the second embodiment is characterized by the sub-scanning device 4 for rotating the sub-scanning reflecting mirror 1.

The sub-scanning device 4 is comprised of an arm 20 rotatable together with the sub-scanning reflecting mirror 1 about an rotational axis of the sub-scanning reflecting mirror 1, and having first and second ends 20a and 20b, a voice coil motor (VCM) 21 supported at the first end 20a of the arm 20 for rotating the sub-scanning reflecting mirror 1, a position sensitive device (PSD) 22, a light source 23 for emitting a light to the position sensitive device 22, and a plate 24 supported at the second end 20b of the arm 20 so that the plate 24 is located in facing relation to the position sensitive device 22. The voice coil motor 20 is comprised of a permanent magnet and a copper wire covered with an insulating film.

In operation, as the sub-scanning reflecting mirror 1 rotates, a light emitted from the light source 23 is not allowed to reach the position sensitive device 22 for a certain period of time. Hence, the position sensitive device (PSD) 22 can detect a rotational angle of the sub-scanning reflecting mirror 1, and accordingly emits a signal to the voice coil motor 20 to thereby rotate the sub-scanning reflecting mirror 1 at a desired speed.

Similarly to the first embodiment illustrated in FIG. 3, the arm 20 of the sub-scanning device 4 is positioned along an oblique line of the trapezoidal sub-scanning reflecting mirror 1 within a difference between the first and second widths W1 and W2 so that the width Ws of the sub-scanning device 4 is within a half of a difference between the first and second widths W1 and W2. Hence, the sub-scanning device 4 does not exist beyond the maximum width W2 of the sub-scanning reflecting mirror 1.

Third Embodiment

Figure 5:
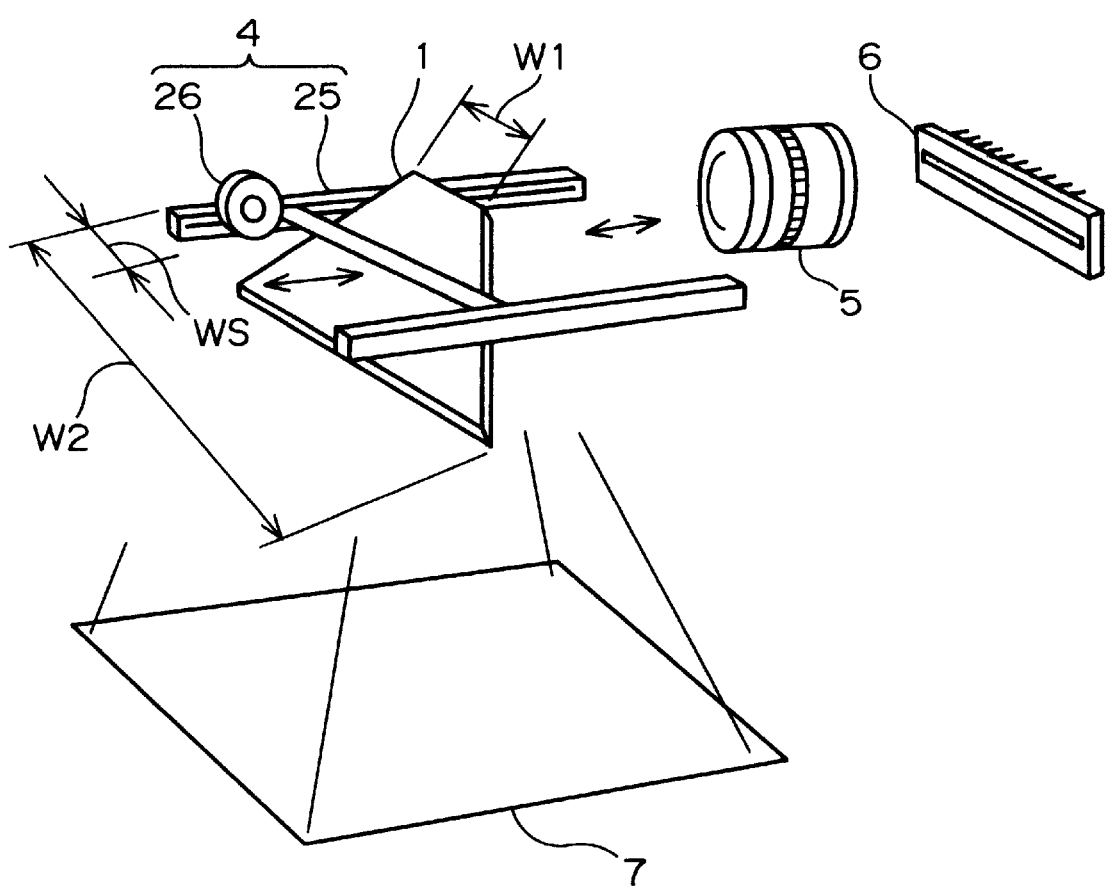
FIG. 5 is a perspective view illustrating an image scanner in accordance with the third embodiment of the present invention.

FIG. 5 illustrates an image scanner in accordance with the third embodiment. The image sensor in accordance with the third embodiment is characterized by the sub-scanning device 4 for moving the sub-scanning reflecting mirror 1 along an axis of the lens 5. The sub-scanning reflecting mirror 1 is horizontally moved between a pair of rails 25 by means of a motor 26. The rails 25 are supported at a certain height in parallel to both the document 7 and an axis of the lens 5.

As the sub-scanning reflecting mirror 1 moves horizontally in parallel to the document 7, images of the document 7 from one end to the other are reflected to and focused onto the linear image sensor 6.

Similarly to the first and second embodiments, the sub-scanning device 4 comprising the rails 25 and the motor 26 is positioned along an oblique line of the trapezoidal sub-scanning reflecting mirror 1 so that the width Ws of the sub-scanning device 4 is within a half of a difference between the first and second widths W1 and W2. Hence, the sub-scanning device 4 does not exist beyond the maximum width W2 of the sub-scanning reflecting mirror 1.

In addition, by designing the sub-scanning reflecting mirror 1 to be trapezoidal, the sub-scanning reflecting mirror 1 has a reduced weight relative to a conventional rectangular sub-scanning reflecting mirror 1. The sub-scanning reflecting mirror 1 is a movable portion in sub-scanning operation. Reduction in weight of the sub-scanning reflecting mirror 1 enhances controllability thereof. As a result, it is possible to enhance quality of images, and carry out sub-scanning operation at a higher speed, if necessary.

Fourth Embodiment

The sub-scanning reflecting mirror 1 in the above-mentioned first to third embodiments are all trapezoidal, namely, linearly symmetric about an axis of the lens 5. However, it should be noted that it is not always necessary that the sub-scanning reflecting mirror 1 is symmetric. The sub-scanning reflecting mirror 1 may be asymmetric about an axis of the lens 5.

Figure 6:
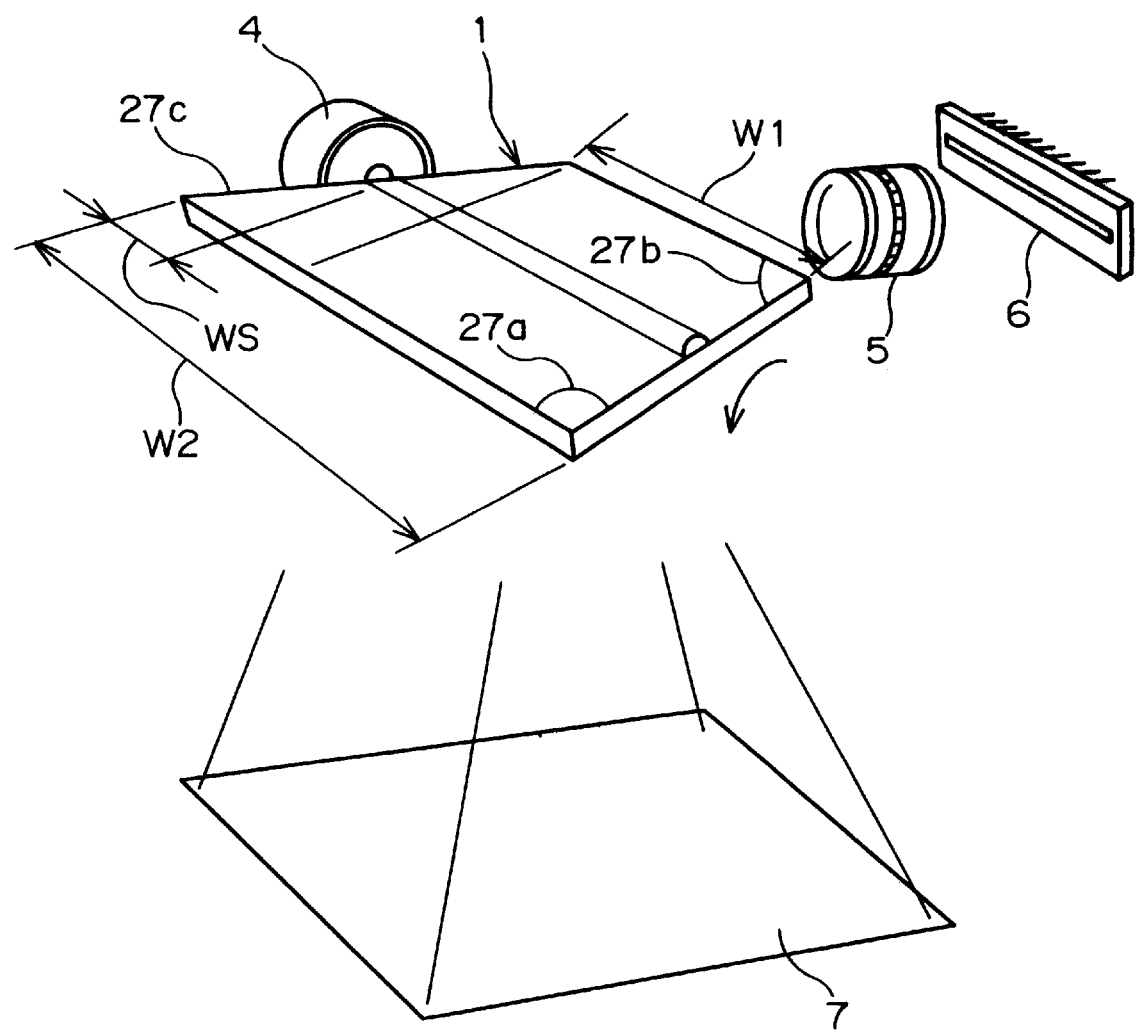
FIG. 6 is a perspective view illustrating an image scanner in accordance with the fourth embodiment of the present invention.

FIG. 6 illustrates an image sensor in accordance with the fourth embodiment wherein the sub-scanning reflecting mirror 1 is asymmetric about an axis of the lens 5. The image sensor in accordance with the fourth embodiment is characterized by an asymmetric sub-scanning reflecting mirror 1. As illustrated in FIG. 4, the sub-scanning reflecting mirror 1 is designed to be an asymmetric trapezoid having two right-angle corners 27a and 27b and an oblique line 27c.

By designing the sub-scanning reflecting mirror 1 to be an asymmetric trapezoid as illustrated in FIG. 6, similarly to the above-mentioned first to third embodiments, the sub-scanning device 4 can be positioned along the oblique line 27c of the trapezoidal sub-scanning reflecting mirror 1 so that the width Ws of the sub-scanning device 4 is within a difference between the first and second widths W1 and W2. Hence, the sub-scanning device 4 does not exist beyond the maximum width W2 of the sub-scanning reflecting mirror 1.

In addition, the sub-scanning reflecting mirror 1 can have a reduced weight relative to a conventional rectangular sub-scanning reflecting mirror 1, which enhances controllability of the sub-scanning reflecting mirror 1. As a result, it is possible to enhance quality of images, and carry out sub-scanning, operation at a higher speed.

In the above-mentioned embodiments, the sub-scanning reflecting mirror 1 is all designed to be trapezoidal. However, it should be noted that a shape providing the smallest area to the sub-scanning reflecting mirror 1 without exerting a harmful influence on images focused onto the linear image sensor 6 is not always a trapezoid in light of a relation between a width of an optical path and an operation of the sub-scanning reflecting mirror 1. However, it also should be noted that if a sub-scanning reflecting mirror has a first width located closer to a lens and a second width located remoter from a lens, and further if a width of the sub-scanning reflecting mirror 1 is increasing from the first width to the second width, such a sub-scanning reflecting mirror is encompassed within the subject matter of the present invention.

If the sub-scanning reflecting mirror 1 is made of glass, as is usual case, it might be difficult to design a sub-scanning reflecting mirror to have a complicated shape. Hence, it is presently appropriate to design a sub-scanning reflecting mirror to be trapezoidal from the standpoint of fabrication technique and also of accomplishing the advantages of the present invention.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-212063 filed on Aug. 6, 1997 including specification, claims, drawings and summary is incorporated herein by reference in its entirety.

What is claimed is:

1. An image scanner comprising:
   (a) an image sensor;
   (b) a lens for focusing images onto said image sensor;
   (c) a movable reflecting mirror for directing images of an object to said image sensor through said lens; and
   (d) means for moving said movable reflecting mirror along an axis of said lens, said movable reflecting mirror having a first width located closer to said lens and a second width located remoter from said lens than said first width, both of said first and second widths extending in parallel with said image sensor, said first width being smaller than said second width.

2. The image sensor as set forth in claim 1, wherein said reflecting mirror has a width gradually increasing from said first width to said second width.

3. The image sensor as set forth in claim 1, wherein said reflecting mirror is linearly symmetric about an axis of said lens.

4. The image sensor as set forth in claim 3, wherein said reflecting mirror is trapezoidal.

5. The image sensor as set forth in claim 1, wherein said reflecting mirror is trapezoidal.

6. The image sensor as set forth in claim 1, further comprising means for rotating said reflecting mirror about an axis perpendicular to an axis of said lens.

7. The image sensor as set forth in claim 6, wherein said means for rotating said reflecting mirror comprises:
   (a) an arm rotatable together with said reflecting mirror about a rotational axis of said reflecting mirror, and having first and second ends;
   (b) a voice coil motor (VCM) supported at said first end of said arm for rotating said reflecting mirror;
   (c) a position sensitive device (PSD);
   (d) a light source for emitting a light to said position sensitive device; and
   (e) a plate supported at said second end of said arm for intercepting said light from reaching said position sensitive device as said reflecting mirror rotates.

8. An image scanner comprising:
   (a) an image sensor;
   (b) a lens for focusing images onto said image sensor;
   (c) a reflecting mirror to directing images of an object to said image sensor through said lens,
   said reflecting mirror having a first width located closer to said lens and a second width located remoter from said lens than said first width, both of said first and second widths extending in parallel with said image sensor, said first width being smaller than said second width, said reflecting mirror being linearly asymmetric about an axis of said lens.

9. The image sensor as set forth in claim 8, wherein said reflecting mirror is trapezoidal.

10. The image sensor as set forth in claim 9, wherien said reflecting mirror has two right-angle and a hypotenuse.

11. An image scanner comprising:
   (a) an image sensor;
   (b) a lens for focusing images onto said image sensor;
   (c) a reflecting mirror for directing images of an object to said image sensor through said lens; and
   (d) means for supporting or driving said reflecting mirror,
   said reflecting mirror having a first width located closer to said lens and a second width located remoter from said lens than said first width, both of said first and second widths extending in parallel with said image sensor, said first width being smaller than said second width,
   said means being situated within a difference between said first and second widths so that said means does not exist beyond said second width of said reflecting mirror.

12. The image sensor as set forth in claim 11, wherein said reflecting mirror has a width gradually increasing from said first width to said second width.

13. The image sensor as set forth in claim 11, wherien said reflecting mirror is linearly symmetric about an axis of said lens.

14. The image sensor as set forth in claim 13, wherein said reflecting mirror is trapezoidal.

15. The image sensor as set forth in claim 11, wherein said reflecting mirror is trapezoidal.

16. The image sensor as set forth in claim 11, wherein said reflecting mirror is linearly asymmetric about an axis of said lens.

17. The image sensor as set forth in claim 16, wherein said reflecting mirror is trapezoidal.

18. The image sensor as set forth in claim 17, wherein said reflecting mirror has two right-angle corners and a hypotenuse.

19. The image sensor as set forth in claim 11, wherein said means rotates said reflecting mirror about an axis perpendicular to an axis of said lens.

20. The image sensor as set forth in claim 19, wherein said means for rotating said reflecting mirror comprises:
   (a) an arm rotatable together with said reflecting mirror about a rotational axis of said reflecting mirror, and having first and second ends;
   (b) a voice coil motor (VCM) supported at said first end of said arm for rotating said reflecting mirror;
   (c) a position sensitive device (PSD)
   (d) a light source for emitting a light to said position sensitive device; and
   (e) a plate supported at said second end of said arm for intercepting said light from reaching said position sensitive device as said reflecting mirror rotates.

* * * * *